(12) United States Patent
Ohyama

(10) Patent No.: US 8,001,292 B2
(45) Date of Patent: Aug. 16, 2011

(54) DATA TRANSFER CONTROLLING DEVICE AND IC CARD

(75) Inventor: Shigeo Ohyama, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 281 days.

(21) Appl. No.: 12/335,236

(22) Filed: Dec. 15, 2008

(65) Prior Publication Data

US 2009/0164815 A1 Jun. 25, 2009

(30) Foreign Application Priority Data

Dec. 25, 2007 (JP) ................................ 2007-332782

(51) Int. Cl.
*G06F 3/00* (2006.01)
*G06F 13/00* (2006.01)
(52) U.S. Cl. .................. 710/18; 710/8; 710/15; 710/62; 710/74
(58) Field of Classification Search ........................ None
See application file for complete search history.

(56) References Cited

U.S. PATENT DOCUMENTS

| 2001/0040184 | A1* | 11/2001 | Ohki et al. | 235/380 |
|---|---|---|---|---|
| 2002/0014537 | A1* | 2/2002 | Obana et al. | 235/492 |
| 2007/0005829 | A1* | 1/2007 | Fujimoto | 710/48 |

FOREIGN PATENT DOCUMENTS

| JP | 8-202635 | | 8/1996 |
|---|---|---|---|
| JP | 2000-293480 | A | 10/2000 |
| JP | 2001-175544 | A | 6/2001 |
| JP | 2007-193745 | A | 8/2007 |

OTHER PUBLICATIONS

Taylor, Laura, "Smart Cards From Scratch", May 8, 2002, intranetjournal.com, [Online, accessed Nov. 10, 2010], URL: http://www.intranetjournal.com/articles/200205/se_05_08_02a.html.*
Gammel, Berndt M., "Smart Cards Inside", 2005, ieeexplore.ieee.org, [Online, accessed Nov. 10, 2010], URL: http://ieeexplore.ieee.org/stamp/stamp.jsp?tp=&arnumber=1541559.*
Dual IC Card Interface, Phillips, Nov. 6, 2003, [online, accessed on Mar. 26, 2011] URL: http://www.nxp.com/documents/data_sheet/TDA8020HL.pdf.*

* cited by examiner

*Primary Examiner* — Tariq Hafiz
*Assistant Examiner* — Scott Sun
(74) *Attorney, Agent, or Firm* — Birch, Stewart, Kolasch, & Birch, LLP

(57) ABSTRACT

A data transfer controlling device is mounted in an IC card having: a communication device for data communication with an external device; a memory device for storing data received from and transmitted to the external device; and an operation processing device for controlling the memory device and the communication device, and controls a data transfer process. The controlling device comprises: a status information acquiring section for acquiring status information including at least error detection information from the communication device; a determination section for determining whether or not the data transfer process can be executed based on the status information acquired by the status information acquiring section when the data transfer process is being executed; and a data transfer process executing section for executing the data transfer process in accordance with a result of determination as to whether or not the data transfer process can be executed by the determination section.

7 Claims, 8 Drawing Sheets

DATA TRANSFER CONTROLLING DEVICE AND IC CARD

CROSS REFERENCE TO RELATED APPLICATION

This Nonprovisional application claims priority under 35 U.S.C. §119(a) on Patent Application No. 2007-332782 filed in Japan on Dec. 25, 2007, the entire contents of which are hereby incorporated by reference.

BACKGROUND OF THE INVENTION

1. Field of the Invention

The present invention relates to a data transfer controlling device for controlling a data transfer process between at least a communication device and a memory device, and an IC card for carrying out said data transfer process.

2. Description of the Related Art

An IC card generally includes a memory device, such as a RAM (random access memory) or a flash memory, a communication device for communicating with an external device, and a CPU (central processing unit) for controlling an operation of each of the devices mounted in the IC card.

In general, software processes in a CPU have a slower rate of processing than hardware processes for the same level of power consumption, and the power consumption increases when the frequency for operation is set higher in order to increase the rate of processing. Therefore, some IC cards used for specific applications, such as electronic tickets for trains, where a high-speed data transfer process and operation with low power consumption are required, are provided with an LSI (DMA controller) dedicated to making a data transfer process between at least a memory device and a communication device implementable through hardware without a CPU intervening, in order to achieve reduction in the processing time.

Here, FIG. 8 shows an example of a conventional IC card provided with a DMA controller. As shown in FIG. 8, an IC card 100 includes a CPU 10 for controlling the operation of the respective devices mounted in the IC card 100, a communication device 40 for non-contact type data communication with an external device, such as an IC card reader, a memory device 30 which can store reception data received by the communication device 40 from an external device, and transmission data transmitted to an external device by the communication device 40, and a DMA controller 110 for controlling the data transfer process between the memory device 30 and the communication device 40. Furthermore, the IC card 100 is provided with an address bus 50 for transmitting various types of control signals, such as address signals and read/write signals, and a data bus 60 for transmitting data signals, such as reception data and transmission data, and the CPU 10 and the DMA controller 110 output various types of control signals to the memory device 30 and the communication device 40 via the address bus 50, so that the data transfer process between the memory device 30 and the communication device 40 is controlled.

A technology for achieving a higher rate of data transfer processing and a reduction in the power consumption in an IC card having a DMA controller provides, for example, an IC card configured so that the number of process clocks per unit hour in the data transfer process is variable, and the number of process clocks is in accordance with the state of operation of the LSI, that is to say, the state in the case where a high-speed process is desired to be carried out or in the case where the power consumption is desired to be lowered (see for example Japanese Unexamined Patent Publication 2007-193745).

In the IC card described in Japanese Unexamined Patent Publication 2007-193745, the DMA controller (memory utility portion) sets the number of process clocks in the CPU so that a parity code for the data is generated in parallel with the data transfer process between the memory device and the communication device at the time of the data transfer process from the communication device to an external device. That is to say, a parity code is generated in parallel with the data transfer process on the DMA controller side instead of in the CPU, and thus, the time for generating a parity code is shorter.

In recent years, however, use of IC cards has been increasing, and it has become a goal to lower power consumption, particularly for IC cards in train tickets, and thus, a technology for increasing the speed of processing without increasing the power consumption has become required.

As a result of an increase in the speed of processing of the CPU in recent years, regarding the difference in the frequency for operation between a communication device for data communication with an external device and a CPU, it has become a goal to increase the speed and lower the power consumption in the data transfer process between a communication device and a memory device for storing transmission data and reception data in data communication.

SUMMARY OF THE INVENTION

The present invention is provided in view of the above-described issue, and an object thereof is to provide a data transfer controlling device which can effectively achieve an increase in the speed and a reduction in power consumption in the data transfer process between a communication device and a memory device. Another object is to provide an IC card which can effectively increase the speed and reduce power consumption in data transfer processes.

In order to achieve the above-described objects, the data transfer controlling device according to the present invention is firstly characterized in that the data transfer controlling device is mounted in an IC card having: a communication device for data communication with an external device; a memory device capable of storing reception data received by the communication device from the external device and transmission data transmitted to the external device by the communication device; and an operation processing device for controlling the memory device and the communication device, and is configured so that a data transfer process at least between the communication device and the memory device can be controlled, and comprises: a status information acquiring section for acquiring status information including at least error detection information from the communication device; a determination section for determining whether or not the data transfer process can be carried out based on the status information acquired by the status information acquiring section when the data transfer process is being carried out; and a data transfer process executing section for carrying out the data transfer process in accordance with a result of determination as to whether or not the data transfer process can be carried out by the determination section.

The data transfer controlling device according to the above-described characteristics of the present invention is secondly characterized by further comprising a register for storing status register address information indicating an address of a storage area where the status information is stored within a storage area of a register provided in the communication device, wherein the status information acquiring section acquires the status register address information from the register for storing status register address information and acquires the status information from the storage area indicated by the status register address information.

The data transfer controlling device according to any of the above-described characteristics of the present invention is thirdly characterized in that the status information acquiring section acquires the status information based on a predetermined condition for monitoring reception at the time of data reception processing from the external device to the communication device, the determination section prevents the data transfer process from the communication device to the memory device from being carried out in a case where the status information includes reception error detection information for the reception data at the time of the data reception processing, and allows the data transfer process from the communication device to the memory device to be carried out in a case where the status information does not include the reception error detection information.

The data transfer controlling device according to any of the above-described characteristics of the present invention is fourthly characterized in that the status information acquiring section acquires the status information at the time of initial setting of the IC card, and the determination section prevents the data transfer process from the memory device to the communication device from being carried out in a case where the status information includes transmission error detection information indicating that the transmission data remains in the communication device, and allows the data transfer process from the memory device to the communication device to be carried out in a case where the status information does not include the transmission error detection information.

The data transfer controlling device according to any of the above-described characteristics of the present invention is fifthly characterized by further comprising a counter circuit for counting the number of transfers of unit data constituting the transmission data at the time of data transfer processing from the communication device to the external device, wherein the determination section prevents the data transfer process from the memory device to the communication device from being carried out in a case where a value of the counter circuit is within a predetermined range for transmission error determination.

The data transfer controlling device according to any of the above-described characteristics of the present invention is sixthly characterized by further comprising a transfer status information outputting section for outputting transfer status information that includes process starting information indicating a start of the data transfer process to the operation processing device when the data transfer process executing section starts the data transfer process, outputting the transfer status information that includes process completion information indicating completion of the data transfer process to the operation processing device when the data transfer process executing section completes the transfer process, and outputting the transfer status information that includes process stopping information indicating that the data transfer process has stopped to the operation processing device when the determination section determines that the data transfer process has stopped.

In order to achieve the above-described objects, the IC card according to the present invention comprises: a communication device for data communication with an external device; a memory device capable of storing reception data received by the communication device from the external device and transmission data transmitted to the external device by the communication device; an operation processing device for controlling the memory device and the communication device; and the data transfer controlling device according to the sixth characteristics, wherein the operation processing device transitions to a low power consumption mode, where the operation processing device is in an operation standby state or an operation frequency is low, in a case where the transfer status information, including the process starting information, is outputted from the data transfer controlling device, and the low power consumption mode is terminated in a case where the transfer status information, including the process stopping information or the process completion information, is outputted from the data transfer controlling device.

The data transfer controlling device having the above-described characteristics acquires status information on the communication device and determines whether or not a data transfer process can be carried out by means of hardware. Therefore, it becomes possible to reduce a period of time for determining whether or not it can be carried out, in comparison with the case where an operation processing device (CPU) determines whether or not it can be carried out by means of software.

Specifically, in the case where reception data to which a parity bit is added for error detection is received by a non-contact type IC card, for example, it is necessary to check errors in one-byte units. In the case where a data reception process for reception data having error detection is carried out through eightfold communication, which is relatively high-speed, in a ISO/IEC 14443 standard non-contact type IC card, for example, the carrier frequency is set to 13.56 MHz (0.0737 $\mu$s), and the subcarrier for communication is set to $\frac{1}{16}$ of the carrier frequency, and therefore, it is necessary to receive one-byte data (11 bits, including a start bit, a stop bit and a parity bit) during 16×11=176 clocks=176×0.0737 $\mu$s≈12.97 $\mu$s (176 clocks) or less. In this case, it becomes possible for the data transfer controlling device having the above-described characteristics to determine on the data transfer controlling device side whether or not a data transfer process between the communication device and the memory device can be carried out based on the results of the parity check carried out by the communication device. As a result, it becomes possible for the data transfer controlling device having the above-described characteristics to prevent the increase in power consumption due to high-speed operation of the CPU and the reduction in precision of reception of reception data more effectively than in the case of the conventional IC card, where whether or not a data transfer process can be carried out is determined on the CPU side, and the data transfer controlling device controls the data transfer process.

The data transfer controlling device according to the second characteristics has status register address information indicating the address of the storage area for storing status information, and thus can form the device of the present invention with a simple configuration.

The data transfer controlling device according to the fifth characteristics includes a counter circuit for counting the number of pieces of unit data, and thus, can find a data capacitance of transmission data or a relative value thereof, for example the number of bytes, with a simple configuration, and it becomes possible to prevent transmission error, such as an overflow.

The data transfer controlling device according to the sixth characteristics is configured so that the operation processing device is notified that the state is such that the data transfer process is being carried out, and therefore, it becomes possible for the operation processing device to know the state of communication of the data transfer controlling device according to the present invention, while keeping the increase in power consumption low.

The IC card having the above-described characteristics can reduce the power consumption more efficiently by acquiring the state in which the data transfer process is being carried out from the data transfer controlling device according to the sixth characteristics, and transitioning to a low power consumption mode during the period when the data transfer process is being carried out, and the IC card is particularly beneficial in the case where it is used for such applications as train tickets, where a reduction in power consumption is required.

DETAILED DESCRIPTION OF THE INVENTION

Hereinafter, a data transfer controlling device according to the present invention (hereinafter referred to as a "device of the present invention") and an IC card according to an embodiment of the present invention are described with reference to the drawings.

First, a configuration of an IC card in which the device of the present invention is mounted is described with reference to FIGS. 1 and 2. Here, FIG. 1 shows an example of a schematic configuration of an IC card 1A in which the device of the present invention is mounted, and FIG. 2 shows an example of a schematic configuration of a device 20 of the present invention.

Figure 1:
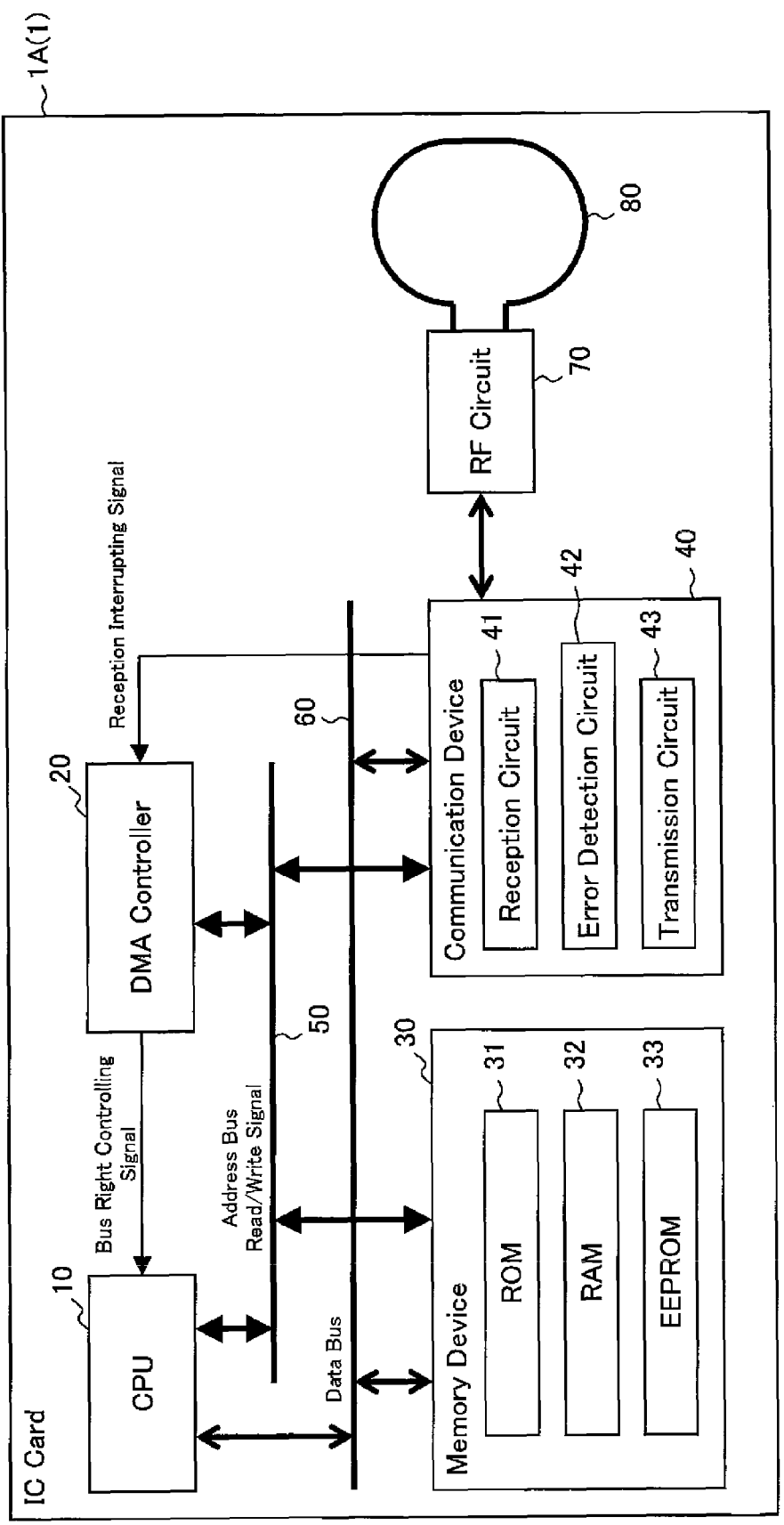
FIG. 1 is a schematic block diagram showing a portion of an example of a schematic configuration of an IC card according to the present invention.
Figure 2:
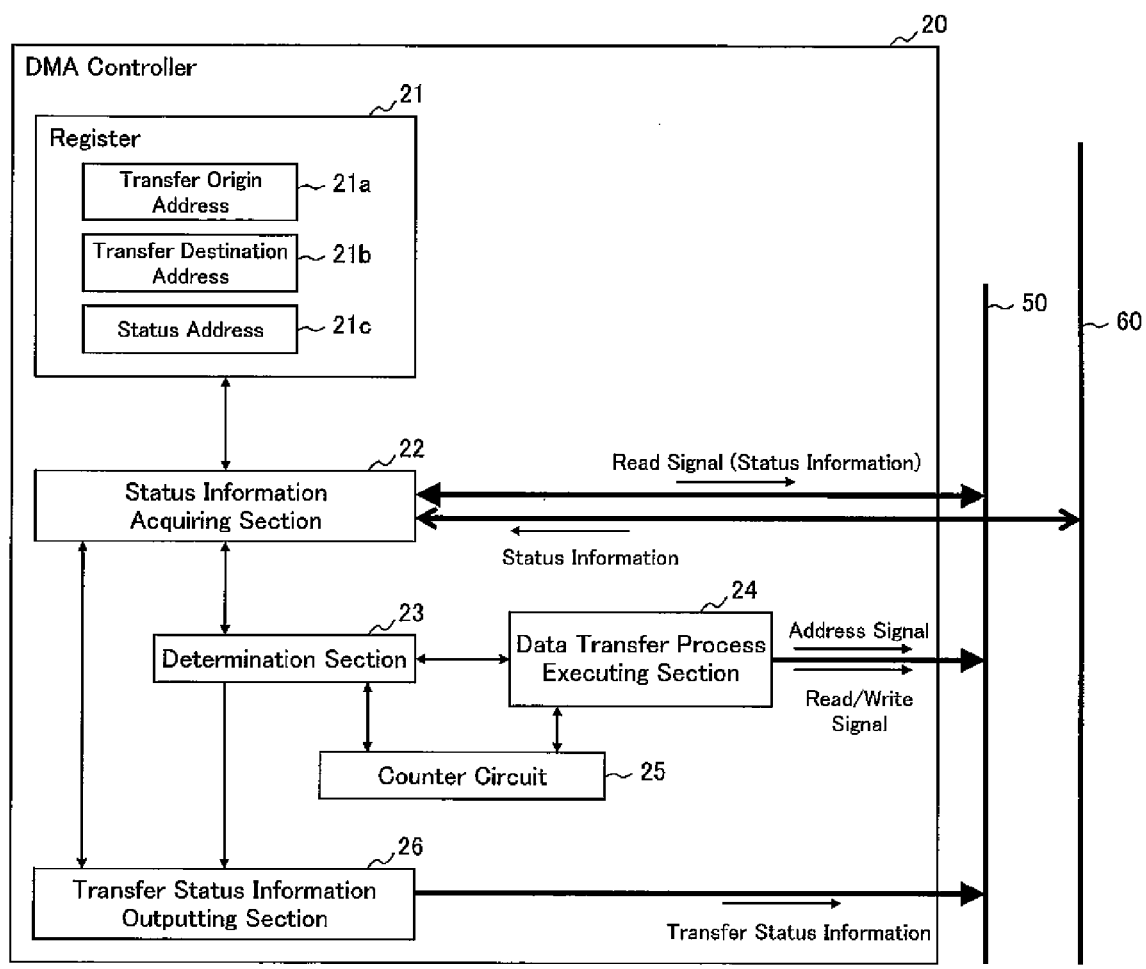
FIG. 2 is a schematic block diagram showing a portion of an example of a schematic configuration of a data transfer controlling device according to the present invention.

As shown in FIG. 1, the IC card 1A according to the present embodiment includes a communication device 40 for data communication with an external device, a memory device 30 which can store reception data received by the communication device 40 from an external device and transmission data transmitted to an external device by the communication device 40, a CPU 10 (corresponding to an operation processing device) for controlling the memory device 30 and the communication device 40, and a DMA controller 20 (corresponding to the device of the present invention) configured so that a data transfer process between at least the communication device 40 and the memory device 30 can be controlled. The communication device 40, the memory device 30, the CPU 10 and the DMA controller 20 are respectively connected to each other via an address bus 50 for transmitting control signals, such as address signals and read/write signals, and a data bus 60 for transmitting transfer data, including reception data and transmission data, and the communication device 40 and the memory device 30 are controlled by the CPU 10 or by the DMA controller 20. The address bus 50 and the data bus 60 are controlled either by the CPU 10 or the DMA controller 20, depending on the content of control.

In the present embodiment, a non-contact type IC card, for a train ticket, for example, is assumed, and the IC card 1A includes an antenna 80 for non-contact type data communication, and an RF circuit 70 (radio frequency circuit) for transmitting and receiving a high frequency signal to and from the antenna 80.

The communication device 40 is a UART (universal asynchronous receiver transmitter) in the present embodiment, and includes a receiving circuit 41 which can receive reception data provided with a parity bit for error detection, an error detection circuit 42 for determining parity in the reception data, and a transmission circuit 43, which can transmit transmission data to an external device. The reception circuit 41 includes a reception buffer which can temporarily store a part or all of the reception data. Likewise, the transmission circuit 43 includes a transmission buffer which can temporarily store a part or all of the transmission data.

The transmission circuit 43 is configured so as to write status information which includes transmission error detection information in a register within the communication device 40 in the case where data remains in the transmission buffer at the time of initialization of the IC card 1A, for example. In addition, the transmission circuit 43 outputs the transmission data to an external device indicated by the address of the transfer destination when transmission data is written into the transmission buffer.

The reception circuit 41 is configured so as to write status information which includes reception error detection information into a register within the communication device 40 in the case where an error is detected through parity check in one-byte units for the reception data in the error detection circuit 42. Furthermore, the reception circuit 41 sets an EOF (end of file) flag in the status information in the case where all of the reception data is outputted to the memory device 30. Furthermore, the reception circuit 41 is configured so as to output a reception interrupting signal to the below described DMA controller 20 when reception data is received from an external device.

The memory device 30 includes a ROM (read only memory) 31 for storing a program, which enables the IC card 1A to have various functions, a RAM (random access memory) 32, which is used as a primary memory device, and an EEPROM (electrically erasable programmable ROM) 33, which is an example of a nonvolatile memory.

The CPU 10 runs a program stored in the ROM 31 in the memory device 30, and thus, controls various functions of the IC card 1A. In addition, the CPU 10 outputs a DMA transfer starting command which indicates a data transfer process by means of the DMA controller 20 to the DMA controller 20 via the address bus 50 in the case where transmission data is transmitted to an external device. The DMA transfer starting command includes the address of the transfer origin of transmission data and the address of the transfer destination.

The DMA controller 20 is configured so that a data transfer process can be carried out between the memory device 30 and the communication device 40 and, as shown in FIG. 2, provided with a status information acquiring section 22 for acquiring status information which includes at least error detection information from the communication device 40, a determination section 23 for determining whether or not a data transfer process can be carried out based on the status information acquired by the status information acquiring section 22 when a data transfer process is being carried out, and a data transfer process executing section 24 for carrying out a data transfer process in accordance with the results of determination as to whether or not a data transfer process can be carried out by the determination section 23.

Furthermore, the DMA controller 20 according to the present embodiment includes a register 21 which can store status register address information indicating the address of the storage area where status information is stored within the storage area of the register provided in the communication device 40, a counter circuit 25 for counting the number of transfers of unit data constituting transmission data at the time of the data transmission process from the communication device 40 to an external device, and a transfer status information outputting section 26 for outputting transfer status information which includes process starting information indicating the start of a data transfer process to the operation processing device when the data transfer process executing section 24 starts a data transfer process, outputting transfer status information which includes process completion information indicating the completion of a data transfer process when the data transfer process executing section 24 completes a data transfer process, and outputting transfer status information which includes process stopping information indicating that the data transfer process has stopped when the determination section 23 determines that the data transfer process has stopped.

More specifically, a transfer origin address storing area 21*a* for storing the address of the transfer origin of transmission data which is the object of data transfer processing, a transfer destination address storing area 21*b* for storing the address of the transfer destination, and a status address storing area 21*c* for storing status register address information are set in the register 21.

The counter circuit 25 is a down counter in the present embodiment, and configured so as to be set at a preset initial value (maximum value) at the time of the initial setting (when the power is turned on and at the time of reset operation) of the IC card 1A, and lower the value by 1 in the case where the data transfer process executing section 24 outputs unit data which constitutes transmission data from the memory device 30 to the communication device 40. The initial value of the down counter is set to a value which is the number of bytes or less of the transmission data that can be accepted by the communication device 40, and with which it can be determined that there is overflow in the communication device 40.

The status information acquiring section 22 acquires status information at the time of a data transfer process, specifically, at the time of a data reception process from an external device to the communication device 40, and at the time of the initial setting of the IC card 1A. More specifically, the status information acquiring section 22 reads out status register address information from the status address storing area 21*c* of the register 21 and outputs a read signal for acquiring status information from the memory area in the register of the communication device 40 indicated by the status register address information to the communication device 40 via the address bus 50. When a signal indicating status information is outputted from the communication device 40 via the data bus 60, the status information acquiring section 22 accepts the status information and outputs the same to the below described determination section 23 and the transfer status information outputting section 26.

The determination section 23 stops carrying out the data transfer process from the communication device 40 to the memory device 30 in the case where status information includes reception error detection information for the reception data at the time of a data reception process, and allows the data transfer process from the communication device 40 to the memory device 30 to be carried out in the case where the status information does not include reception error detection information. In addition, the determination section 23 stops carrying out the data transfer process from the memory device 30 to the communication device 40 in the case where the status information includes transmission error detection information which indicates that transmission data remains in the communication device 40, and allows the data transfer process from the memory device 30 to the communication device 40 to be carried out in the case where the status information does not include transmission error detection information.

Furthermore, the determination section 23 according to the present embodiment stops carrying out the data transfer process from the memory device 30 to the communication device 40 in order to prevent overflow in the communication device 40 in the case where the value of the counter circuit 25 is within a predetermined transmission error determination range, for example in the case where the counter circuit 25 is a down counter and the value of the counter becomes 0.

Hereinafter, the operation of the DM controller 20 is described with reference to FIGS. 3 and 4. Here, FIG. 3 shows a process procedure for a data transfer process in the case where the communication device 40 accepts reception data from an external device, and FIG. 4 shows a process procedure for a data transfer process in the case where transmission data is transmitted from the communication device 40 to an external device.

First, a process procedure for a data transfer process in the case where the communication device 40 accepts reception data from an external device is described with reference to FIG. 3. In the present embodiment, a case where a data transfer process is carried out when a reception interrupting signal is outputted to the DMA controller 20 from the communication device 40 is described.

Figure 3:
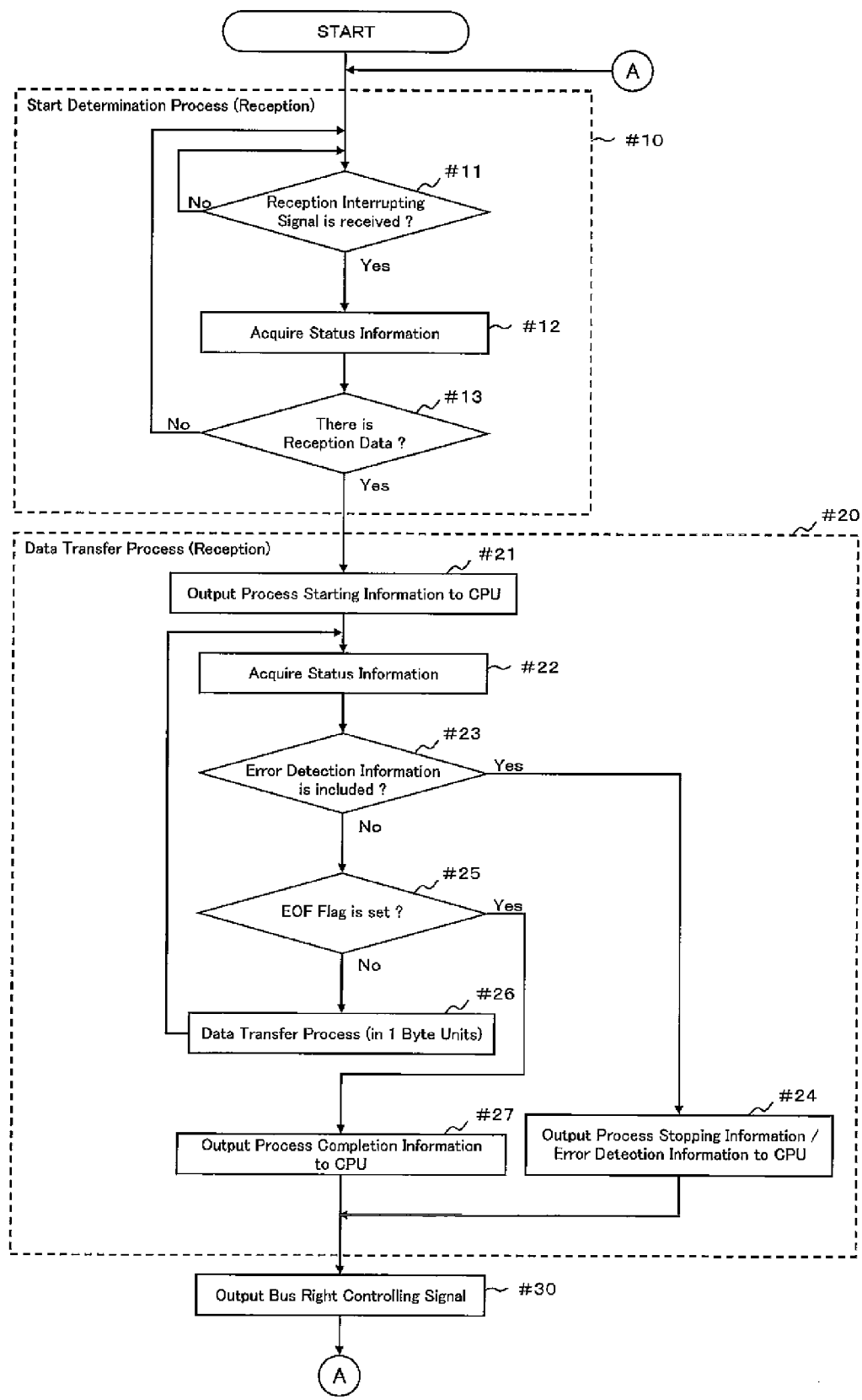
FIG. 3 is a flow chart showing a process procedure of a data transfer process at the time of data reception in the data transfer controlling device according to the present invention.
Figure 4:
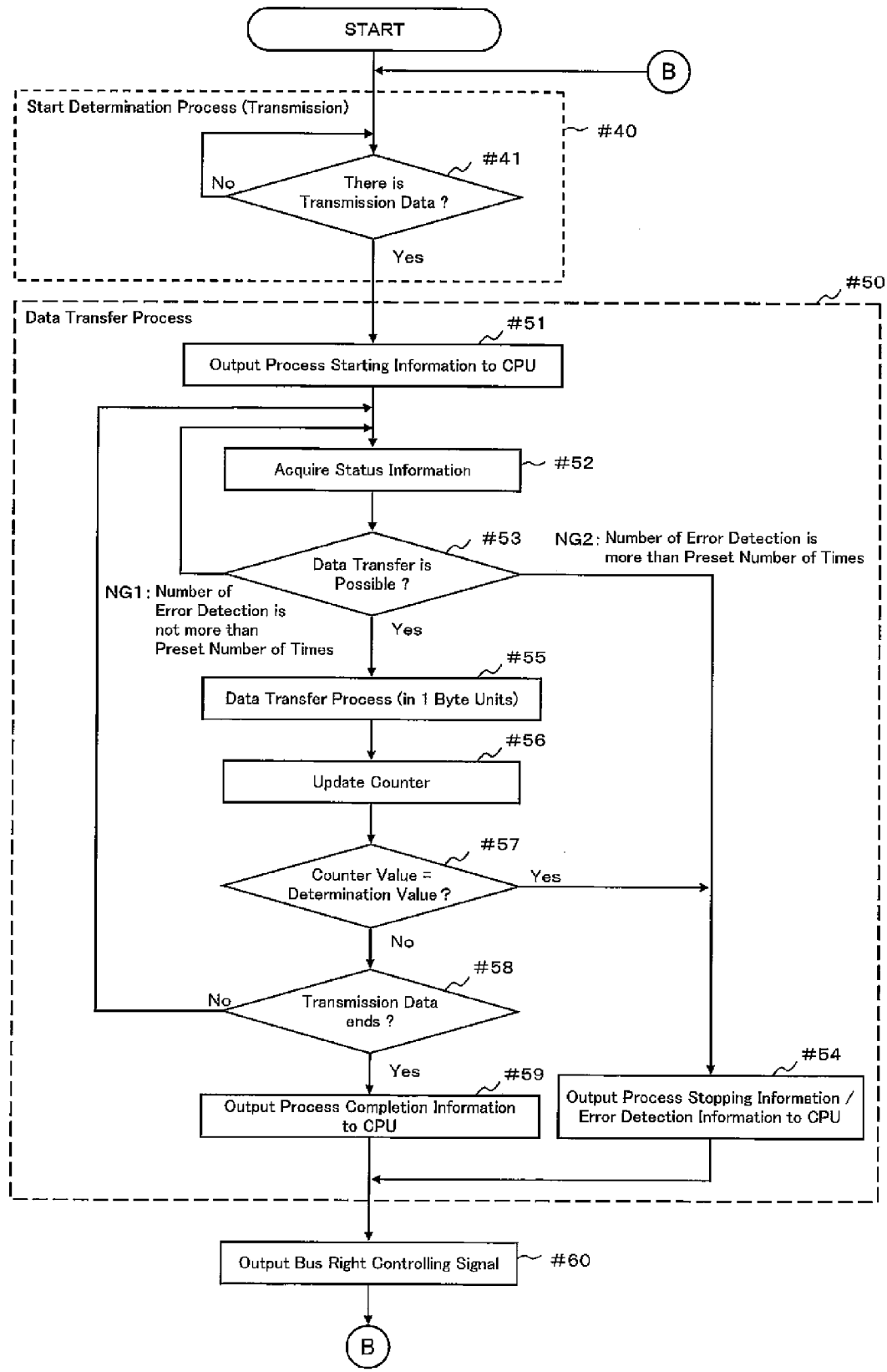
FIG. 4 is a flow chart showing a process procedure of a data transfer process at the time of data transmission in the data transfer controlling device according to the present invention.

As shown in FIG. 3, the DMA controller 20 carries out a process for determining the start of a data transfer process for reception data (step #10) when the power of the IC card 1A is turned on and the CPU 10 starts up the DMA controller 20.

Specifically, the DMA controller 20 becomes of a standby state for a reception interrupting signal from the communication device 40 when the power of the IC card 1A is turned on (Step #11). When a reception interrupting signal is received from the communication device 40 ("Yes" branch in Step #11), the status information acquiring section 22 in the DMA controller 20 reads out status register address information from the register 21 and outputs a read signal for acquiring status information to the communication device 40 via the address bus 50. When a signal indicating status information is outputted from the communication device 40 via the data bus 60, the status information acquiring section 22 accepts status information and outputs the same to the determination section 23 (Step #12). Subsequently, the determination section 23 determines whether or not a reception flag which indicates that there is reception data in the communication device 40 is set in the status information (Step #13). In the case where a reception flag which indicates that there is reception data in the communication device 40 is not set in the status information ("No" branch in Step #13), the procedure goes to the standby state in Step #11.

In the case where a reception flag which indicates that there is reception data in the communication device 40 is set in the status information ("Yes" branch in Step #13), the determination section 23 in the DMA controller 20 starts a data transfer process for the reception data (Step #20).

Specifically, the transfer status information outputting section 26 in the DMA controller 20 outputs transfer status information which includes process starting information for the data transfer process for the reception data to the CPU 10 via the address bus 50 (Step #21). The CPU 10 transitions to a low power consumption mode with a low operation frequency when the transfer status information which includes the process starting information for the data transfer process is outputted.

Subsequently, the status information acquiring section 22 outputs a read signal for acquiring status information to the communication device 40, acquires status information from the communication device 40, and outputs this to the determination section 23 (Step #22). The determination section determines whether or not the status information includes reception error detection information (Step #23). In the case where the determination section 23 determines that the status information includes reception error detection information ("Yes" branch in Step #23), the transfer status information outputting section 26 outputs transfer status information which includes error detection information and process stopping information to the CPU 10 via the address bus 50 (Step #24).

In the case where the status information does not include reception error detection information ("No" branch in Step #23), the determination section determines whether or not an EOF flag which indicates completion of the data transfer process in reception data is set in the status information (Step #25). In the case where an EOF flag is not set in the status information ("No" branch in Step #25), the data transfer process executing section 24 transfers reception data in one-byte units from the reception buffer of the communication device 40 to the memory device 30 (Step #26).

In the case where an EOF flag is set in the status information in Step #25 ("Yes" branch in Step #25), the transfer status information outputting section 26 outputs transfer status information which includes process completion information indicating normal completion of the data transfer process for reception data to the CPU 10 via the address bus 50 (Step #27).

After carrying out Step #24 in the case where there is a reception error, or after carrying out Step #27 in the case of normal completion of the data transfer process for reception data, the DMA controller 20 outputs a bus right controlling signal to the CPU 10 (Step #30). The CPU 10 acquires transfer status information and terminates the low power consumption mode upon reception of a bus right controlling signal.

Next, the process procedure for a data transfer process in the case where transmission data is transmitted to an external device from the communication device 40 is described with reference to FIG. 4. In the present embodiment, a case where a data transfer process is carried out when a DMA transfer starting command is outputted to the DMA controller 20 from the CPU 10 is described. In addition, the data transfer process for transmission data shown in FIG. 4 is carried out independently of the data transmission process for reception data shown in FIG. 3.

As shown in FIG. 4, the DMA controller 20 carries out a process for determining the start of a data transfer process for transmission data (Step #40) when the power of the IC card 1A is turned on and the CPU 10 starts up the DMA controller 20. The DMA controller 20 becomes of a standby state for a DMA transfer starting command from the CPU 10 (Step #41) when the power of the IC card 1A is turned on.

When a DMA transfer starting command is outputted from the CPU 10 ("Yes" branch in Step #41), the determination section 23 in the DMA controller 20 starts a data transfer process for transmission data (Step #50).

Specifically, the transfer status information outputting section 26 in the DMA controller 20 first outputs transfer status information which includes process starting information for a data transfer process for transmission data to the CPU 10 via the address bus 50 (Step #21). The CPU 10 transitions to a low power consumption mode with a low operation frequency when transfer status information which includes process starting information for a data transfer process is outputted.

Subsequently, the status information acquiring section 22 outputs a read signal for acquiring status information to the communication device 40, acquires status information from the communication device 40, and outputs this status information to the determination section 23 (Step #52). The determination section 23 determines whether or not the status information includes transmission error detection information indicating that transmission data remains in the transmission buffer of the communication device 40 (Step #53). In the case where the status information includes transmission error detection information ("NG1" branch in Step #53), the procedure goes to Step #52 after a certain period of time, and status information is acquired again. In the case where error determination in Steps #52 and #53 is carried out more than a preset number of times ("NG2" branch in Step #53), the transfer status information outputting section 26 outputs transfer status information which includes process stopping information and transmission error detection information to the CPU 10 (Step #54).

In the case where the determination section 23 determines that a data transfer process for transmission data is possible ("Yes" branch in Step #53), the data transfer process executing section 24 transfers transmission data to the transfer buffer in the communication device 40 in one-byte units from the memory device 30 (Step #55). At this time, the counter circuit 25 reduces the counter value by 1 (Step #56). Here, in the present embodiment, a case where the counter value is 0 or less is within the transmission error determination range, and therefore, the determination section 23 determines whether or not the counter value is 0 (Step #57). In the case where the counter value is 0 ("Yes" branch in Step #57), the transfer status information outputting section 26 outputs transfer status information which includes transmission error detection information and process stopping information to the CPU 10 via the address bus 50 (Step #54).

In the case where the counter value is 0 or higher ("No" branch in Step #57), the determination section 23 determines whether or not all of the transmission data stored in the memory device 30 has been transferred (Step #58). In the case where the transfer of all of the transmission data is not completed ("No" branch in Step #58), the procedure goes to Step #52. In the case where the determination section 23 determines that the transfer of all of the transmission data has been completed ("Yes" branch in Step #58), the transfer status information outputting section 26 outputs transfer status information which includes process completion information indicating normal completion of a data transfer process for transmission data to the CPU 10 (Step #59). The count at this time may be outputted to the CPU 10 as an index value indicating the byte number of the transmission data, included in the transfer status information.

After carrying out Step #54 in the case where there is a transmission error, or after carrying out Step #59 in the case of normal completion of the data transfer process for transmission data, the DMA controller 20 outputs a bus right controlling signal to the CPU 10 (Step #60). The CPU 10 acquires transfer status information and terminates the low power consumption mode upon receiving the bus right control signal.

Other Embodiments (1) Although in the above-described embodiment, a case where a data transfer process is carried out on reception data when a reception interrupting signal is outputted from the communication device 40 in the IC card 1A is described, the present invention is not limited thereto.

Figure 5:
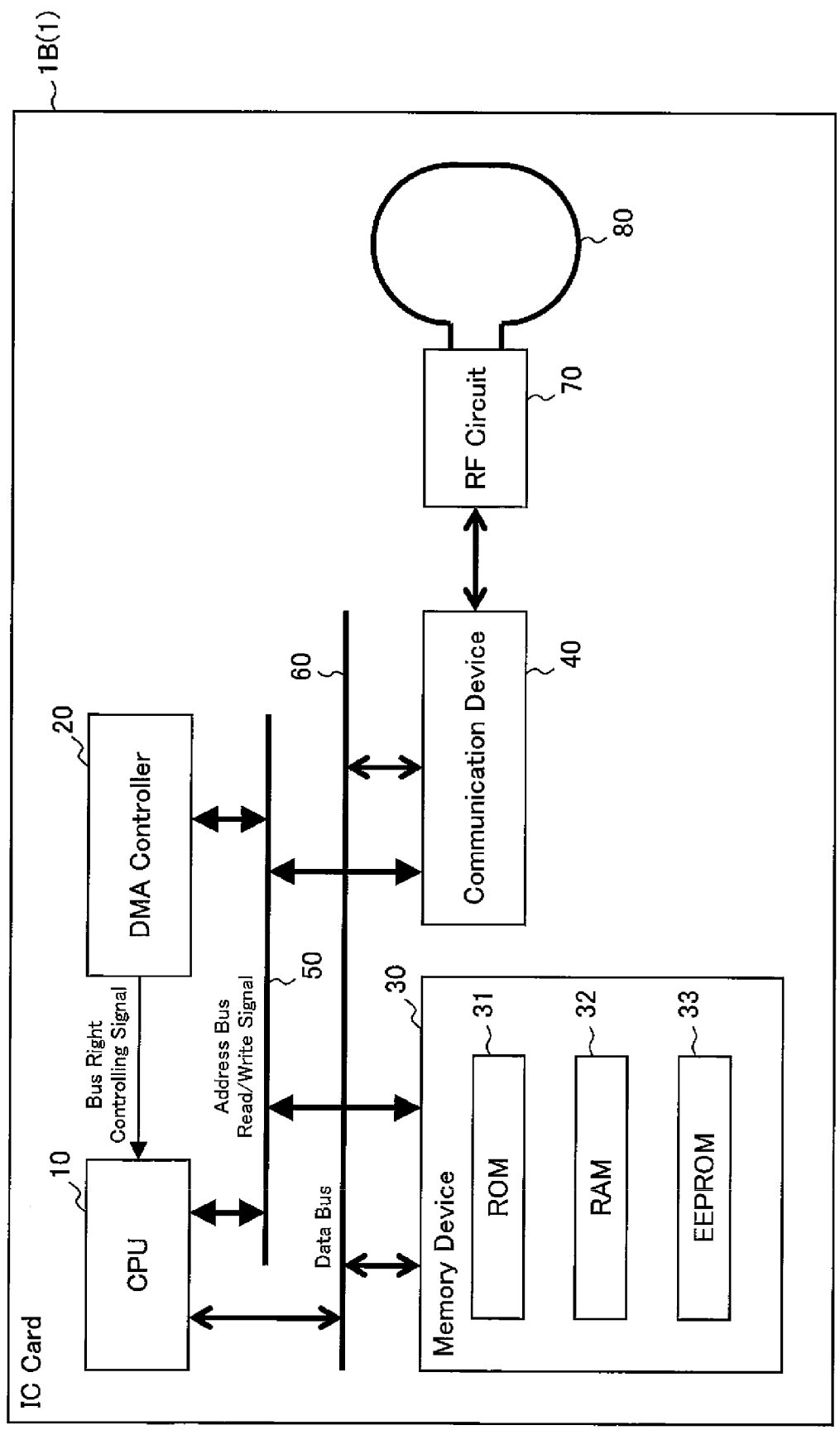
FIG. 5 is a schematic block diagram showing a portion of an example of a schematic configuration of an IC card according to another embodiment of the present invention.
Figure 6:
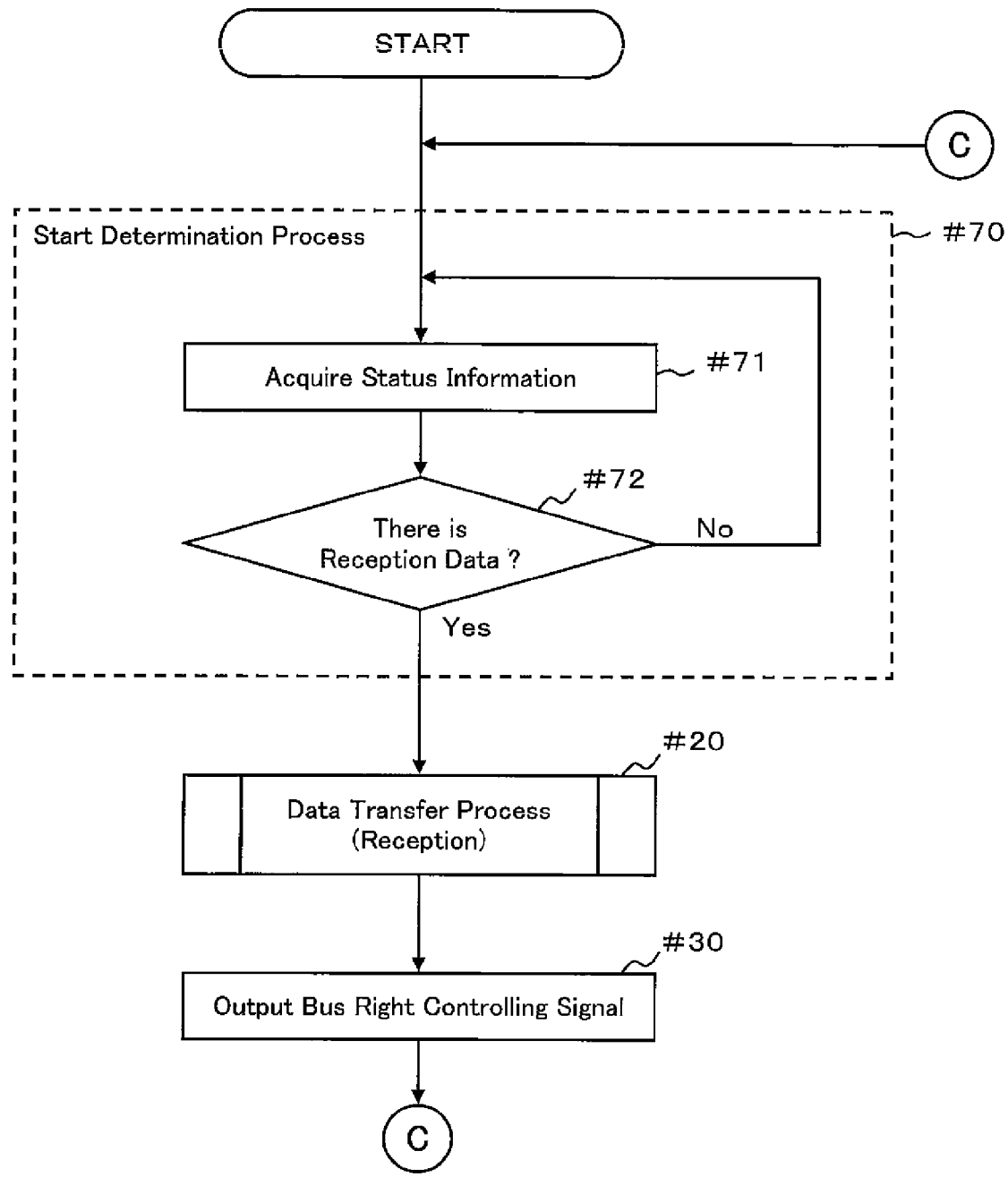
FIG. 6 is a flow chart showing a process procedure of a data transfer process at the time of data reception in the data transfer controlling device according to another embodiment of the present invention.

For example, the DMA controller 20 may have such a configuration that polling is carried out on the communication device 40 without receiving a reception interrupting signal from the communication 40. Specifically, as shown in FIGS. 5 and 6, in the start determining process (Step #70), the DMA controller 20 may periodically acquire status information from the communication device 40 (Step #71). In the case where a reception flag indicating that there is reception data in the status information is set ("Yes" branch in Step #72, the procedure may go to Step #20, and a data transfer process for reception data is started.

(2) Although in the above-described embodiment, a case where a data transfer process is carried out on transmission data when a DMA transfer starting command is outputted from the CPU 10 in the IC card 1A is described, the present invention is not limited thereto.

Figure 7:
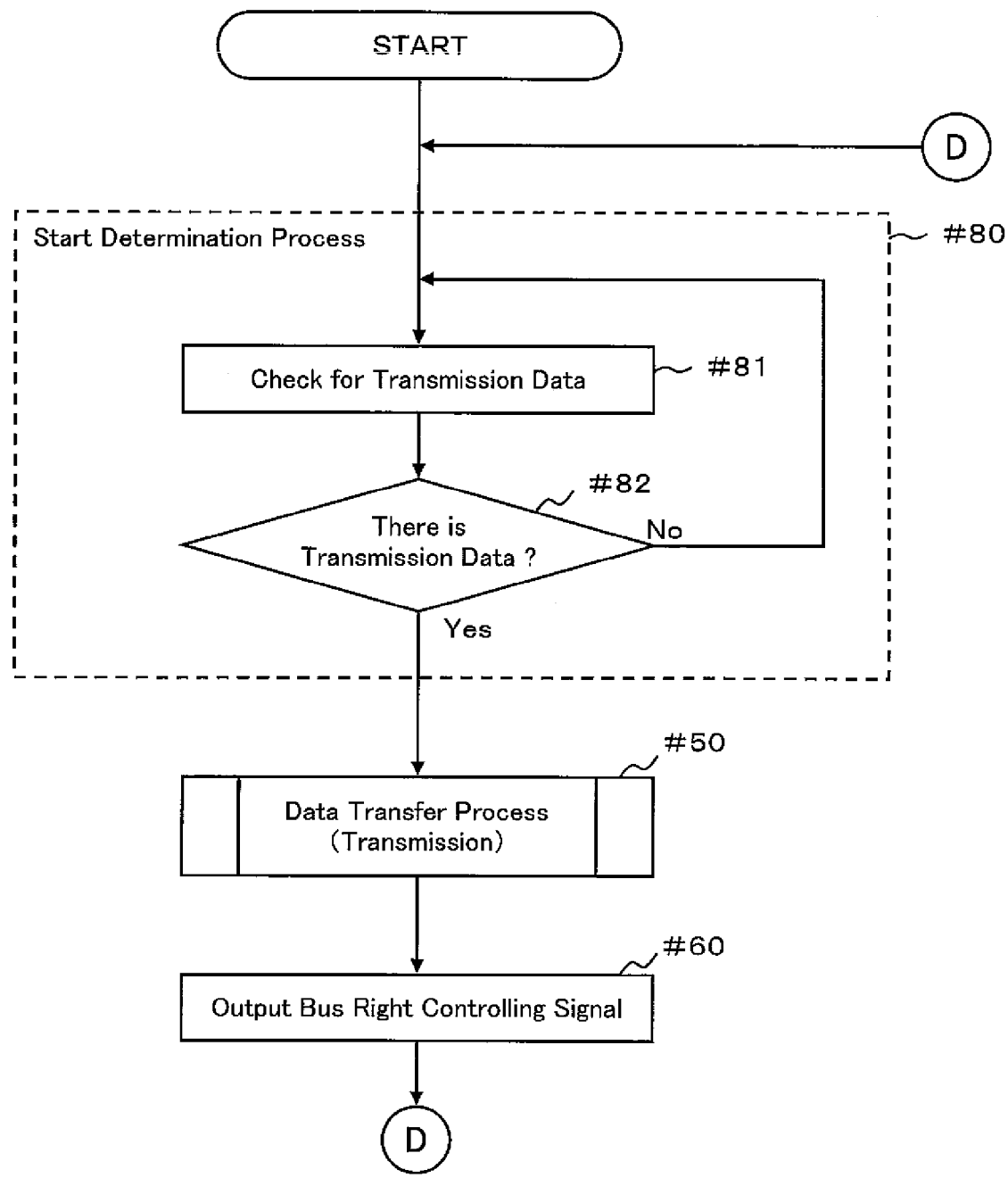
FIG. 7 is a flow chart showing a process procedure of a data transfer process at the time of data transmission in a data transfer controlling device according to anther embodiment of the present invention.
Figure 8:
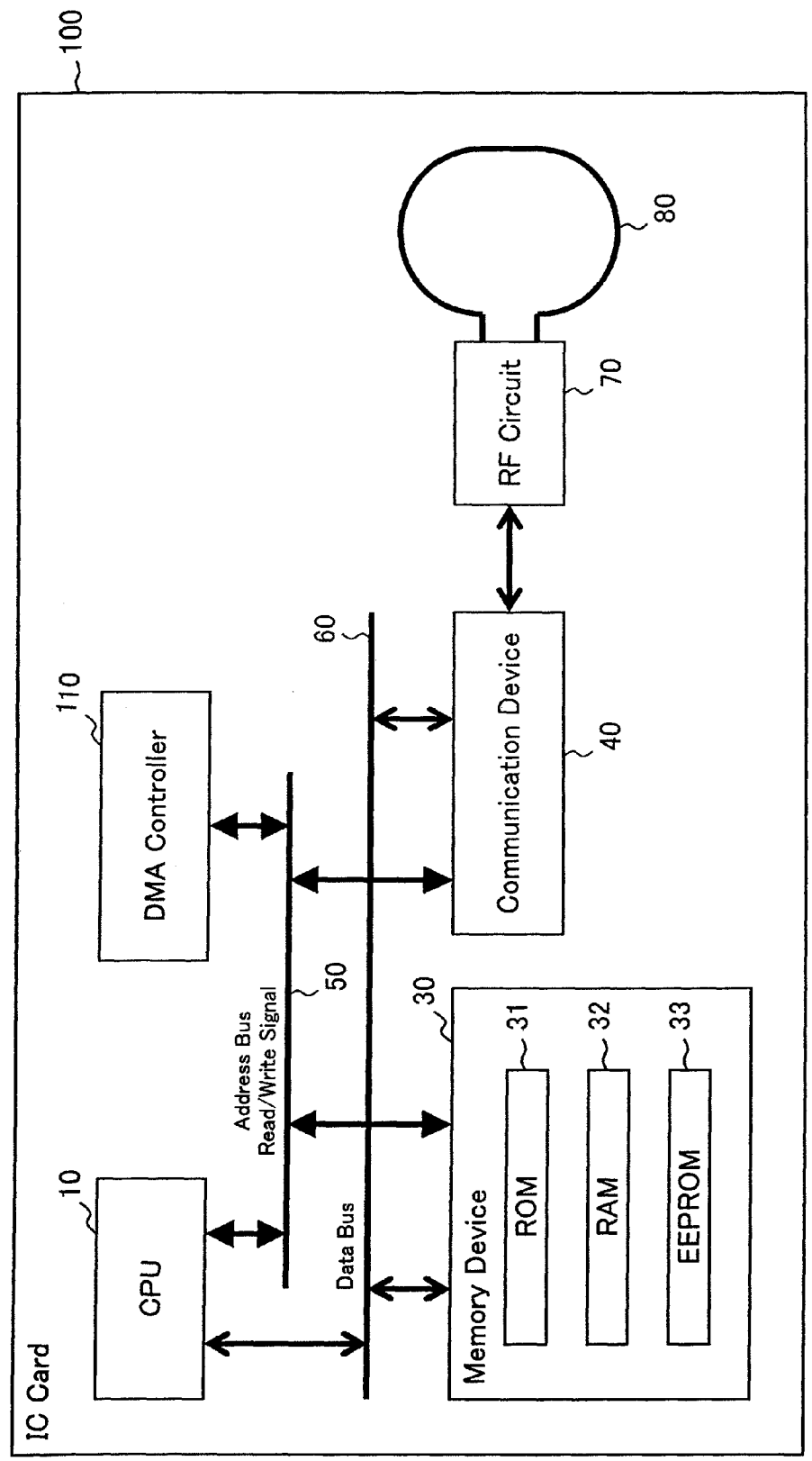
FIG. 8 is a schematic block diagram showing a portion of an example of a schematic configuration of an IC card according to a related art.

For example, the DMA controller 20 may have a such configuration that polling is carried out on the memory device 30 without receiving a DMA transfer starting command from the CPU 10. Specifically, as shown in FIG. 7, in the start determining process (Step #80), the DMA controller may periodically determine whether or not there is un-transmitted transmission data in a predetermined area of the memory device 30 (Step #81). In the case where there is un-transmitted transmission data ("Yes" branch in Step #82), the procedure may go to Step #50, and a data transfer process of transmission data may be started.

Here, such a configuration may be provided that both a start determining process for a data transfer process for transmission data and a start determining process for a data transfer process for reception data are carried out through polling.

(3) Although in the above-described embodiment, a case where the communication device 40 corresponds to reception data having a parity bit and is configured so that a parity check can be carried out is described, the present invention is not limited thereto. The communication device 40 may correspond to reception data using other error detecting methods or error correcting methods, for example reception data using a hamming code with which error correction can be carried out.

(4) Although in the above-described embodiment, the CPU 10 is configured so that the operation frequency becomes lower when transitioning to a low power consumption mode when the DMA controller 20 carries out a data transfer process, the CPU 10 may also be configured to be in an operation standby state.

Although the present invention has been described in terms of the preferred embodiment, it will be appreciated that various modifications and alternations might be made by those skilled in the art without departing from the spirit and scope of the invention. The invention should therefore be measured in terms of the claims which follow.

What is claimed is:

1. A data transfer controlling device mounted in an IC card, the IC card having: a communication device for data communication with an external device; a memory device capable of storing reception data received by the communication device from the external device and transmission data transmitted to the external device by the communication device; and an operation processing device for controlling the memory device and the communication device, the data transfer controlling device configured so that a data transfer process at least between the communication device and the memory device can be controlled without intervention from the operation processing device, the data transfer controlling device comprising:

a status information acquiring section for acquiring status information from the communication device, the status information including at least one of a reception error detection information from the external device and a transmission error detection information to the external device;

a determination section for determining whether or not the data transfer process can be carried out based on the status information acquired by the status information acquiring section when the data transfer process is being carried out; and a data transfer process executing section for carrying out the data transfer process in accordance with a result of determination as to whether or not the data transfer process can be carried out by the determination section.

2. The data transfer controlling device according to claim 1, further comprising:

a register for storing status register address information indicating an address of a storage area where the status information is stored within a storage area of a register provided in the communication device, wherein the status information acquiring section acquires the status register address information from the register for storing the status register address information and acquires the status information from the storage area indicated by the status register address information.

3. The data transfer controlling device according to claim 1, wherein the status information acquiring section acquires the status information based on a predetermined condition for monitoring reception at the time of data reception processing from the external device to the communication device, the determination section prevents the data transfer process from the communication device to the memory device from being carried out in a case where the status information includes reception error detection information for the reception data at the time of the data reception processing, and allows the data transfer process from the communication device to the memory device to be carried out in a case where the status information does not include the reception error detection information.

4. The data transfer controlling device according to claim 1, wherein the status information acquiring section acquires the status information at the time of initial setting of the IC card, and the determination section prevents the data transfer process from the memory device to the communication device from being carried out in a case where the status information includes transmission error detection information indicating that the transmission data remains in the communication device, and allows the data transfer process from the memory device to the communication device to be carried out in a case where the status information does not include the transmission error detection information.

5. The data transfer controlling device according to claim 1, further comprising:
a counter circuit for counting a number of transfers of unit data constituting the transmission data at the time of data transfer processing from the communication device to the external device, wherein
the determination section prevents the data transfer process from the memory device to the communication device from being carried out in a case where a value of the counter circuit is within a predetermined range for transmission error determination.

6. The data transfer controlling device according to claim 1, further comprising:
a transfer status information outputting section for outputting transfer status information that includes process starting information indicating a start of the data transfer process to the operation processing device when the data transfer process executing section starts the data transfer process, outputting the transfer status information that includes process completion information indicating completion of the data transfer process to the operation processing device when the data transfer process executing section completes the transfer process, and outputting the transfer status information that includes process stopping information indicating that the data transfer process has stopped to the operation processing device when the determination section determines that the data transfer process has stopped.

7. An IC card, comprising:
a communication device for data communication with an external device;
a memory device capable of storing reception data received by the communication device from the external device and transmission data transmitted to the external device by the communication device;
an operation processing device for controlling the memory device and the communication device; and
the data transfer controlling device configured so that a data transfer process at least between the communication device and the memory device can be controlled without intervention from the operation processing device, the data transfer controlling device including,
a status information acquiring section for acquiring status information from the communication device, the status information including at least one of a reception error detection information from the external device and a transmission error detection information to the external device;
a determination section for determining whether or not the data transfer process can be carried out based on the status information acquired by the status information acquiring section when the data transfer process is being carried out;
a data transfer process executing section for carrying out the data transfer process in accordance with a result of determination as to whether or not the data transfer process can be carried out by the determination section, and
a transfer status information outputting section for outputting transfer status information that includes process starting information indicating a start of the data transfer process to the operation processing device when the data transfer process executing section starts the data transfer process, outputting the transfer status information that includes process completion information indicating completion of the data transfer process to the operation processing device when the data transfer process executing section completes the transfer process, and outputting the transfer status information that includes process stopping information indicating that the data transfer process has stopped to the operation processing device when the determination section determines that the data transfer process has stopped, wherein
the operation processing device transitions to a low power consumption mode, where the operation processing device is in an operation standby state or an operation frequency is low, in a case where the transfer status information, including the process starting information, is outputted from the data transfer controlling device, and
the low power consumption mode is terminated in a case where the transfer status information, including the process stopping information or the process completion information, is outputted from the data transfer controlling device.

* * * * *